United States Patent Office 3,299,048
Patented Jan. 17, 1967

1

3,299,048
3α,5α - EPOXY METHANO - STEROIDAL COMPOUNDS AND PROCESS FOR THE PRODUCTION THEREOF
Wataru Nagata, Nishinomiya-shi, and Tsutomu Sugasawa, Kobe, Japan, assignors to Shionogi & Co., Ltd., Osaka, Japan, a corporation of Japan
No Drawing. Filed Apr. 15, 1964, Ser. No. 360,133
35 Claims. (Cl. 260—239.55)

The present invention relates to formation of a double bond in steroids. More particularly, it relates to a process for constructing a double bond between the 9- and 11-positions of Δ$^4$-3-oxo-steroids.

In the present specification, the term "steroid" is intended to mean not only those having a cyclopentanopolyhydrophenanthrene nucleus but also those having a cyclohexanopolyhydrophenanthrene nucleus, inclusively.

It is a basic object of the present invention to embody a process for introducing a double bond into the 9- and 11-positions of steroids, the double bond being available for chemical formation of the 11-hydroxyl or 11-oxo group which has a close relationship to manifestation of effective physiological activity. Another object of this invention is to embody a process for constructing a double bond between the 9- and 11-positions which is generally applicable to Δ$^4$-3-oxo-steroids. A further object of the invention is to embody a process for introducing a double bond into the 9- and 11-positions of steroids consisting of a series of steps, some of which are originally novel. These and other objects will be apparent to those conversant with the art to which the present invention pertains from the subsequent description of the general class of compounds and certain specific examples of particular members as well as general and specific methods for their production.

The process of the present invention substantially comprises seven steps, i.e. hydrocyanation, ketalation, reduction, hydrolysis, hydrocyanation, reduction and diazotization. The conversions in these steps are representable by the following scheme showing only the partial structure:

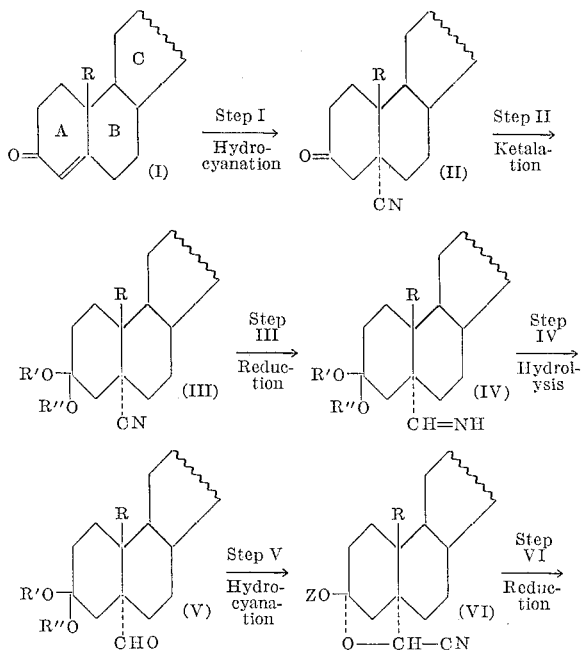

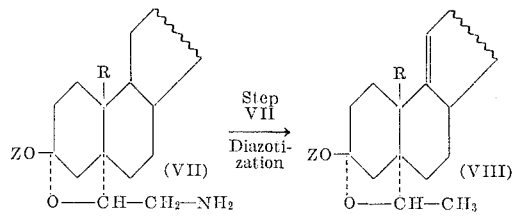

wherein R is a hydrogen atom or a methyl group, R' and R" each is a lower alkyl group (e.g. methyl, ethyl, propyl, butyl) or, when linked together, they represent a lower alkylene group (e.g. ethylene, propylene) and Z is a lower alkyl group (e.g. methyl, ethyl, propyl, butyl) or an ω-hydroxy(lower)alkyl group (e.g. β-hydroxyethyl, γ-hydroxypropyl). Of these steps, the first step per se has been described and claimed in copending application of W. Nagata, Ser. No. 261,215, filed February 26, 1963 now U.S. 3,231,566 and is not within the scope of the present invention. However, the step will be hereinafter illustrated for convenience as well as the other steps of the present process.

The starting material of the present process is the Δ$^4$-3-oxo-steroid including the structure of Formula I. Apart from the said structure, it may include such a substituent which does not exert any unfavorable effect on the reactions of the present process as 16-methyl group and 17-side chain. Further, it may belong to any one of the steroid series: e.g. gonane, estrane, androstane, D-homoandrostane, pregnane, norpregnane, cholane, cholestane, norcholestane, spirostane, sitostane, ergostane, etc. Specific examples of the Δ$^4$-3-oxo-steroid (I) are as follows: 4-estrene-3,17-dione, 17β-hydroxy-4-estren-3-one, 17β-acetyloxy-17α-ethynyl-4-estren-3-one, 17β-hydroxy-17α-ethynyl-4-estren-3-one, 4-androstene-3,17-dione, 17β-hydroxy-4 - androsten - 3 - one, 17β - acetyloxy - 4 - androsten - 3-one, 17β-propionyloxy-4-androsten-3-one, 17β-hydroxy-17α - methyl - 4 - androsten - 3 - one, 17β - hydroxy-17α-ethynyl - 4 - androsten - 3 - one, 17 - methyl - D - homo-4-androsten-3-one, 4-pregnene-3,20-dione, 17β-hydroxy-4-pregnen - 3 - one, 17,20,20,21 - bismethylenedioxy - 4-pregnen - 3 - one, 17α,21 - dihydroxy - 4 - pregnene-3,20-dione, 17α - hydroxy - 21 - acetyloxy - 4 - pregnene - 3,20-dione, 4-cholesten-3-one, 4-spirosten-3-one, etc.

In the first step, the starting Δ$^4$-3-oxo-steroid (I) is subjected to hydrocyanation. The hydrocyanation may be accomplished by treating the Δ$^4$-3-oxo-steroid (I) substantially with a complex anion represented by the formula:

$$[AlYY'Y''CN]^-  \quad (A)$$

wherein Y is a lower alkyl group (e.g. methyl, ethyl, propyl, butyl) or a lower alkoxy group (e.g. methoxy, ethoxy, propoxy, butoxy) and Y' and Y'' each is a lower alkyl group (e.g. methyl, ethyl propyl, butyl), a lower alkoxy group (e.g. methoxy ethoxy, propoxy, butoxy), a halogen atom (e.g. chlorine, bromine) or a cyano group in a substantially anhydrous medium to give the 3-oxo-5α-cyano-steroid (II). Practically, the hydrocyanation may be carried out by treating the Δ$^4$-3-oxo-steroid (I) with a combination of hydrocyanic acid or an aluminum cyanide compound represented by the formula:

AlYY′CN wherein Y and Y′ each has the same significance as designated above such as di(lower)alkyl aluminum cyanide, lower alkyl aluminum dicyanide, di(lower)alkoxy aluminum cyanide, lower alkoxy aluminum dicyanide and lower alkyl lower alkoxy aluminum cyanide with an aluminum compound represented by the formula:

AlYY′Y″ wherein Y, Y′ and Y″ each has the same significance as designated above such as tri(lower)alkyl aluminum, di(lower)alkyl aluminum lower alkoxide, lower alkyl, aluminum di(lower)alkoxide, aluminum tri(lower)alkoxide, di(lower)alkyl aluminum halide, lower alkyl aluminum dihalide, di(lower)alkyl aluminum cyanide and lower alkyl aluminum halide cyanide in a substantially anhydrous medium (e.g. benzene, ether, tetrahydrofuran, dioxane), usually at a temperature from room temperature (10° to 30° C.) to reflux temperature. By execution of the above reaction, there may be produced the addition product of the fragments of the complex anion (A) to the starting $\Delta^4$-3-oxo-steroid (I) or the hydrocyanic acid adduct of the 3-oxo-5α-cyano-steroid (II). However, the former addition product is readily hydrolyzed in the presence or absence of an acid or an alkali, usually in the course of the recovery operation, to give the 3-oxo-5α-cyano-steroid (II) or the hydrocyanic acid adduct thereof. The latter adduct is also readily hydrolyzed with an aqueous alkaline solution such as sodium hydroxide, potassium hydroxide, sodium carbonate and potassium carbonate to the 3-oxo-5α-cyano-steroid (II).

In the second step, the 3-oxo-5α-cyano-steroid (II) is subjected to ketalation about the 3-oxo group. The ketalation may be effected by a per se conventional procedure. For instance, the 3-oxo-5α-cyano-steroid (II) is treated with a lower alkanol (e.g. methanol, ethanol, propanol, butanol) or a lower alkylene glycol (e.g. ethylene glycol, propylene glycol) in the presence of an acidic catalyst (e.g. p-toluene-sulfonic acid, sulfuric acid, acetic acid, hydrochloric acid), usually at a temperature from room temperature (10° to 30° C.) to reflux temperature, to give the 3-ketalated oxo-5α-cyano-steroid (III). In the reaction, if necessary, there may be employed an inert solvent (e.g. benzene, toluene, xylene, dichloromethane).

In the third step, the 3-ketalated oxo-5α-cyano-steroid (III) is subjected to reduction. The reduction can be effected by treating the 3-ketalated oxo-5α-cyano-steroid (III) with a metal hydride (e.g. lithium aluminum hydride, sodium aluminum hydride, magnesium aluminum hydride, aluminum hydride, lithium aluminum lower alkoxy hydride) in substantially anhydrous inert solvent (e.g. ether, tetrahydrofuran, dioxane), usually at a temperature from room temperature (10° to 30° C.) to reflux temperature, whereby there is produced the 3-ketalated oxo-5α-imino-methyl-steroid (IV).

In the fourth step, the 3-ketalated oxo-5α-imino-methyl-steroid (IV) is subjected to hydrolysis. The hydrolysis can be readily accomplished by treating the 3-ketalated oxo-5α-iminomethyl-steroid (IV) with a basic substance (e.g. sodium hydroxide, potassium hydroxide, calcium hydroxide, sodium carbonate, sodium acetate, alumina) in an aqueous medium, usually at a temperature from room temperature (10° to 30° C.) to reflux temperature. If necessary, there may be used a water-miscible solvent (e.g. dioxane, tetrahydrofuran, methanol, ethanol) as the reaction solvent. The hydrolysis can be also accomplished by treating the 3-ketalated oxo-5α-iminomethyl-steroid (IV) with an acid in an aqueous medium but, in such case, the simultaneous deketalation at the 3-position is apt to be caused. In order to avoid such simultaneous deketalation, a suitable contrivance for lowering the acidity may be taken. For instance, the use of a buffer solution consisting of acetic acid and sodium acetate can accomplish the object without unfavorable deketalation. The product of this step is the 3-ketalated oxo-5α-formyl-steroid (V).

In the fifth step, the thus-prepared 3-ketalated oxo-5α-formyl-steroid (V) is subjected to hydrocyanation. The hydrocyanation may be realized in the same manner as illustrated in the first step. Thus, the 3-ketalated oxo-5α-formyl-steroid (V) is treated substantially with the complex anion (A) in a substantially anhydrous medium, ordinarily at a temperature from room temperature (10° to 30° C.) to reflux temperature, to give the cyano-3α,5α-epoxymethano-steroid (VI).

In the sixth step, the cyano-3α,5α-epoxymethano-steroid (VI) is subjected to reduction. The reduction may be carried out by treating the cyano-3α,5α-epoxymethano-steroid (VI) with a metal hydride (e.g. lithium aluminum hydride, sodium aluminum hydride, magnesium aluminum hydride, aluminum hydride, lithium aluminum lower alkoxy hydride) in a substantially anhydrous inert solvent (e.g. ether, tetrahydrofuran, dioxane), normally at a temperature from room tempreature (10° to 30° C.) to reflux temperature. In alternative, the same object may be attained by the catalytic reduction using platinum, nickel or palladium catalyst or the use of nascent hydrogen prepared from, for instance, metallic sodium and ethanol. The product in this step is the aminomethyl-3α,5α-epoxymethano-steroid (VII).

In the seventh step, the above-prepared aminomethyl-3α,5α-epoxymethano-steroid (VII) is subjected to diazotization. The diazotization may be accomplished by treating the aminomethyl - 3α,5α - epoxymethano-steroid (VII) substantially with nitrous acid. Actually, the aminomethyl-3α,5α-epoxymethano-steroid (VII) is treated with an alkali nitrite (e.g. sodium nitrite, potassium nitrite) in the presence of an acid (e.g. hydrochloric acid, sulfuric acid, acetic acid) in an aqueous medium, usually at a temperature from 0° C. to room temperature (10° to 30° C.), to give the methyl-3α,5α-epoxymethano-steroid (VIII). If necessary, there may be used a water-miscible solvent (e.g. dioxane, tetrahydrofuran, methanol, ethanol) as the reaction solvent. Although the reaction mode is a conventional diazotization, it is characteristic that the simultaneous dehydrogenation takes place at the 9- and 11-positions.

The process of the present invention has been hereinabove illustrated step by step, but these steps may be executed successively without the isolation of the product in each step, especially when the prepared intermediate can be difficultly purified or is not stable. Further, it should be understood that the above disclosure only illustrates a typical procedure for carrying out the present invention and some modifications may be apparent to those conversant with the art to which the present invention pertains without departing from the spirit of the invention.

The finally obtained methyl-3α,5α-epoxymethano-steroid (VIII) retains a double bond between the 9- and 11-positions. The substituent present at the 5α-position can be eliminated according to the following scheme whereby the $\Delta^4$-3-oxo structure is recovered:

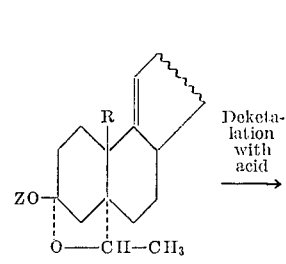

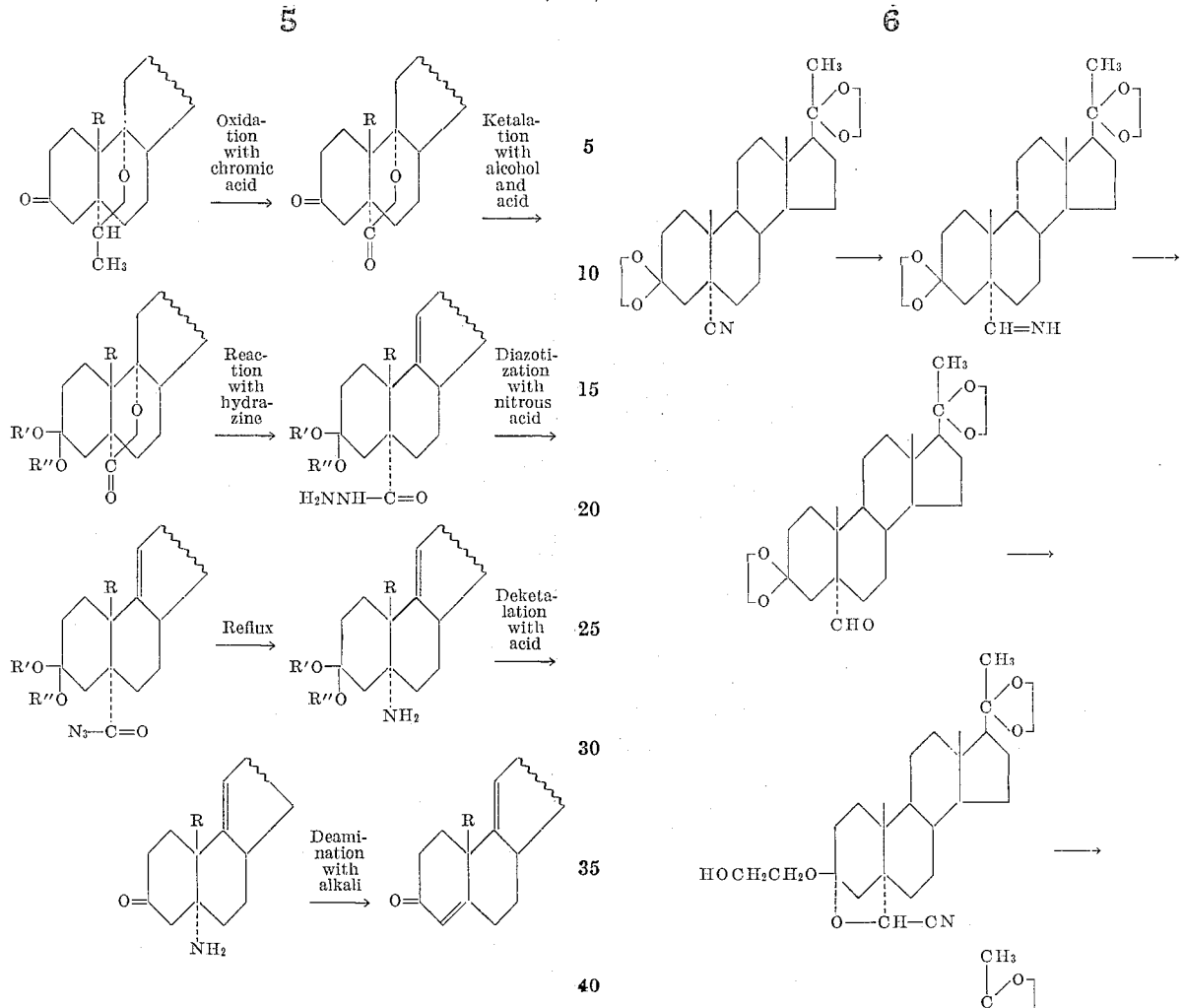

wherein R, R', R" and Z each has the same significance as designated above.

Accordingly, the methyl-3α,5α-epoxymethano-steroid (VIII) is useful as an intermediate in the synthesis of the corresponding Δ⁴-3-oxo-steroid having a double bond between the 9- and 11-positions. Thus, the present process is utilizable for conversion of a 9,11-saturated Δ⁴-3-oxo-steroid into the corresponding 9,11-unsaturated Δ⁴-3-oxo-steroid.

Presently preferred embodiments of the present invention are illustratively shown in the following examples. In these examples, abbreviations have conventional meanings: e.g., g., gram(s); mg., milligram(s); ml., millilitre(s); ° C., degrees centigrade; Anal. Calcd., analysis calculated.

EXAMPLE 1

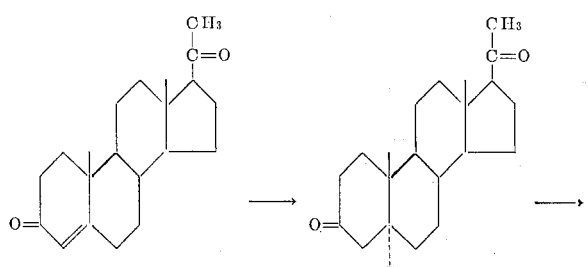

[A] Preparation of 5 - cyano - 5α - pregnane - 3,20-dione: A solution of 4-pregnene-3,20-dione [Butenandt et al.: Chem. Ber., vol. 67, p. 1440 (1934)] (40 g.) in tetrahydrofuran (500 ml.) is added to a mixture of triethyl aluminum (69.8 ml.), tetrahydrofuran (800 ml.) and hydrocyanic acid (15.8 ml.) while cooling with ice, and the resultant mixture is allowed to stand at room temperature (10° to 30° C.) overnight. The reaction mixture is combined with a solution of sodium hydroxide (57.7 g.) in water (1300 ml.) and shaken with a mixture of chloroform and ether. The organic solvent layer is separated, washed with water and the solvent evaporated. The residue is crystallized from methanol to give 5 - cyano - 5α - pregnane - 3,20 - dione (20.5 g.) as crystals melting at 229° to 231° C.

I.R.: $\lambda_{max.}^{CHCl_3}$ 2236, 1702 cm.$^{-1}$

*Analysis.*—Calcd. for $C_{22}H_{31}O_2N$: C, 77.37; H, 9.15; N, 4.10. Found: C, 77.24; H, 9.22; N, 4.32.

[B] Preparation of 3,3,20,20 - bisethylenedioxy - 5 - cyano - 5α - pregnane: To a suspension of 5 - cyano - 5α - pregnane-3,20-dione (16.75 g.) in ethylene glycol (1000 ml.), there is added p-toluenesulfonic acid (840 mg.), and the resultant mixture is heated on an oil bath at 130° to 140° C. and then ethylene glycol (760 ml.) gradually distilled out in 2 to 2.5 hours. The reaction mixture is combined with 2 N sodium carbonate solution and shaken with dichloromethane. The dichloromethane layer is washed with water, dried over anhydrous sodium sulfate and the solvent evaporated. The residue is crystallized from a mixture of dichloromethane and methanol to give 3,3,20,20 - bisethylenedioxy - 5 - cyano - 5α - pregnane (17.14 g.) as crystals melting at 258° to 260° C.

I.R.: $\lambda_{max.}^{CHCl_3}$ 2214, 1076 cm.$^{-1}$

*Analysis.*—Calcd. for $C_{26}H_{39}O_4N$: C, 72.69; H, 9.15; N, 3.26. Found: C, 72.68; H, 9.22; N, 3.45.

[C] Preparation of 3,3,20,20 - bisethylenedioxy - 5 - iminomethyl - 5α - pregnane: A solution of 3,3,20,20 - bis - ethylenedioxy - 5 - cyano - 5α - pregnane (17.93 g.) in tetrahydrofuran (1500 ml.) is dropwise added to a solution of lithium aluminum hydride (9.0 g.) in tetrahydrofuran (200 ml.) while cooling with ice. The resultant mixture is stirred for 4 hours at room temperature (10° to 30° C.). Then, water (12 ml.) is dropwise added thereto while cooling with ice. The precipitate is collected by filtration and treated with chloroform. The chloroform extract is combined with the filtrate and shaken with water. The chloroform layer is dried over anhydrous sodium sulfate and the solvent evaporated. The residue is crystallized from a mixture of dichloromethane and methanol to give 3,3,20,20 - bisethylenedioxy - 5 - iminomethyl-5α-pregnane (14.53 g.) as crystals melting at 164° to 166° C.

I.R.: $\lambda_{max.}^{CHCl_3}$ 1630, 1072 cm.$^{-1}$

*Analysis.*—Calcd. for $C_{26}H_{41}O_4N$: C, 72.35; H, 9.58; N, 3.25. Found: C, 72.19; H, 9.59; N, 3.44.

[D] Preparation of 3,3,20,20-bisethylenedioxy-5-formyl-5α-pregnane: A mixture of 3,3,20,20-bisethylenedioxy-5-iminomethyl-5α-pregnane (14.28 g.), sodium acetate (4.62 g.), tetrahydrofuran (300 ml.) and methanol (300 ml.) is combined with glacial acetic acid (12.8 ml.) and water (37 ml.), and the resultant mixture is refluxed for 5 minutes. The reaction mixture is combined with water and shaken with dichloromethane. The dichloromethane layer is washed with 2 N sodium carbonate solution and water in order, dried over anhydrous sodium sulfate and the solvent evaporated. The residue is crystallized from a mixture of dichloromethane and methanol to give 3,3,20,20-bisethylenedioxy-5-formyl-5α-pregnane (13.30 g.) as crystals melting at 184° to 187° C.

I.R.: $\lambda_{max.}^{CHCl_3}$ 1704, 1078 cm.$^{-1}$

*Analysis.*—Calcd. for $C_{26}H_{40}O_5$: C, 72.19; H, 9.32. Found: C, 72.44; H, 9.37.

[E] Preparation of 3β - (β - hydroxyethyloxy)-20,20-ethylenedioxy - 3α,5α - epoxymethano-5α-pregnane-5′-carbonitrile: To a solution of 3,3,20,20-bisethylenedioxy-5-formyl-5α-pregnane (11.80 g.) in tetrahydrofuran (65 ml.), there is added a mixture of diethyl aluminum chloride (15 ml.), hydrocyanic acid (2 ml.) and tetrahydrofuran (8 ml.) while cooling with ice, and the resultant mixture is allowed to stand at room temperature (10° to 30° C.) for 3 hours in a flask with a stopper. The reaction mixture is combined with 2 N sodium carbonate solution while cooling with ice and shaken with dichloromethane. The dichloromethane layer is washed with water, dried over anhydrous sodium sulfate and the solvent evaporated. The residue is crystallized from a mixture of dichloromethane and methanol to give 3β-(β-hydroxyethyloxy) - 20,20-ethylenedioxy-3α,5α-epoxymethano-5α-pregnane-5′-carbonitrile (10.61 g.) as crystals melting at 174° to 179° C.

I.R.: $\lambda_{max.}^{CHCl_3}$ 3606, 3506, 2241 cm.$^{-1}$

*Analysis.*—Calcd. for $C_{27}H_{41}O_5N \cdot CH_3OH$: C, 68.40; H, 9.23; N, 2.85. Found: C, 68.69; H, 9.18; N, 3.22.

When 3β-(β-hydroxyethyloxy)-20,20-ethylenedioxy-3α,5α-epoxymethano-5α-pregnane-5′-carbonitrile is acylated with acetic anhydride and pyridine in a per se conventional procedure, there is obtained 3β-(β-acetyloxyethyloxy) - 20,20-ethylenedioxy-3α,5α-epoxymethano-5α-pregnane-5′-carbonitrile as crystals melting at 125° to 126° C. (crystallized from a mixture of methanol and ether).

[F] Preparation of 3β - (β - hydroxyethyloxy)-20,20-ethylenedioxy - 3α,5α - epoxymethano - 5α - pregnane-5′-methylamine: A solution of 3β-(β-hydroxyethyloxy)-20,20 - ethylenedioxy - 3α,5α-epoxymethano-5α-pregnane-5′-carbonitrile (10.18 g.) in a mixture of tetrahydrofuran (120 ml.) and ether (270 ml.) is dropwise added to a suspension of lithium aluminum hydride (9.87 g.) in ether (300 ml.), and the resultant mixture is refluxed for 3 hours. The reaction mixture is combined with water while cooling with ice and filtered. The collected cake is washed with dichloromethane. The washing dichloromethane is combined with the filtrate, washed with water, dried over anhydrous sodium sulfate and the solvent evaporated. The residue is crystallized from methanol to give 3β-(β-hydroxyethyloxy)-20,20-ethylenedioxy-3α,5α-epoxymethano-5α-pregnane - 5′ - methylamine (7.9 g.) as crystals melting at 153° to 156° C.

I.R.: $\lambda_{max.}^{CHCl_3}$ 3604, 3391, 1585 cm.$^{-1}$

*Analysis.*—Calcd. for $C_{27}H_{45}O_5N$: C, 69.94; H, 9.78; N, 3.02. Found: C, 69.48; H, 9.91; N, 3.30.

[G] Preparation of 3β-(β-hydroxyethyloxy)-5′-methyl-3α,5α-epoxymethano-5α-9(11)-pregnen-20-one: To a solution of 3β-(β-hydroxyethyloxy)-20,20-ethylenedioxy-3α,5α-epoxymethano-5α-pregnane-5′-methylamine (2.81 g.) in 50% acetic acid (80 ml.), there is added a solution of sodium nitrite (838 mg.) in water (30 ml.), and the resultant mixture is allowed to stand at room temperature (10° to 30° C.) overnight. The reaction mixture is combined with water and shaken with dichloromethane. The dichloromethane layer is washed with 2 N sodium carbonate solution and the solvent evaporated. The residue is crystallized from ether to give 3β-(β-hydroxyethyloxy) - 5′-methyl-3α,5α-epoxymethano-5α-9(11)-pregnen-20-one (1.73 g.) as crystals melting at 112° to 115° C.

I.R.: $\lambda_{max.}^{CHCl_3}$ 3594, 3404, 1698 cm.$^{-1}$

*Analysis.*—Calcd. for $C_{25}H_{38}O_4$: C, 74.59; H, 9.52. Found: C, 74.39; H, 9.53.

In the similar manner, there are obtained other 3,3,20,20-bis(lower)alkylenedioxy-5-cyano-5α-pregnane,
3,3,20,20-tetra(lower)alkoxy-5-cyano-5α-pregnane,
3,3,20,20-bis(lower)alkylenedioxy-5-iminomethyl-5α-pregnane,
3,3,20,20-tetra(lower)alkoxy-5-iminomethyl-5α-pregnane,
3,3,20,20-bis(lower)alkylenedioxy-5-formyl-5α-pregnane,
3,3,20,20-tetra(lower)alkoxy-5-formyl-5α-pregnane,
3β-(ω-hydroxy(lower)alkoxy)-20,20-(lower)alkylenedioxy-3α,5α-epoxymethano-5α-pregnane-5′-carbonitrile,
3β,20,20-tri(lower)alkoxy-3α,5α-epoxymethano-5α-pregnane-5′-carbonitrile,
3β-(ω-hydroxy(lower)alkoxy)-20,20-(lower)alkylenedioxy-3α,5α-epoxymethano-5α-pregnane-5′-methylamine,
3β,20,20-tri(lower)alkoxy-3α,5α-epoxymethano-5α-pregnane-5′-methylamine, 2β-(ω-hydroxy(lower)alkoxy)-5′-methyl-3α,5α-epoxy-methano-5α-9(11)-pregnen-20-one and
3β-(lower)alkoxy-5′-methyl-3α,5α-epoxymethano-5α-9(11)-pregnen-20-one.

EXAMPLE 2

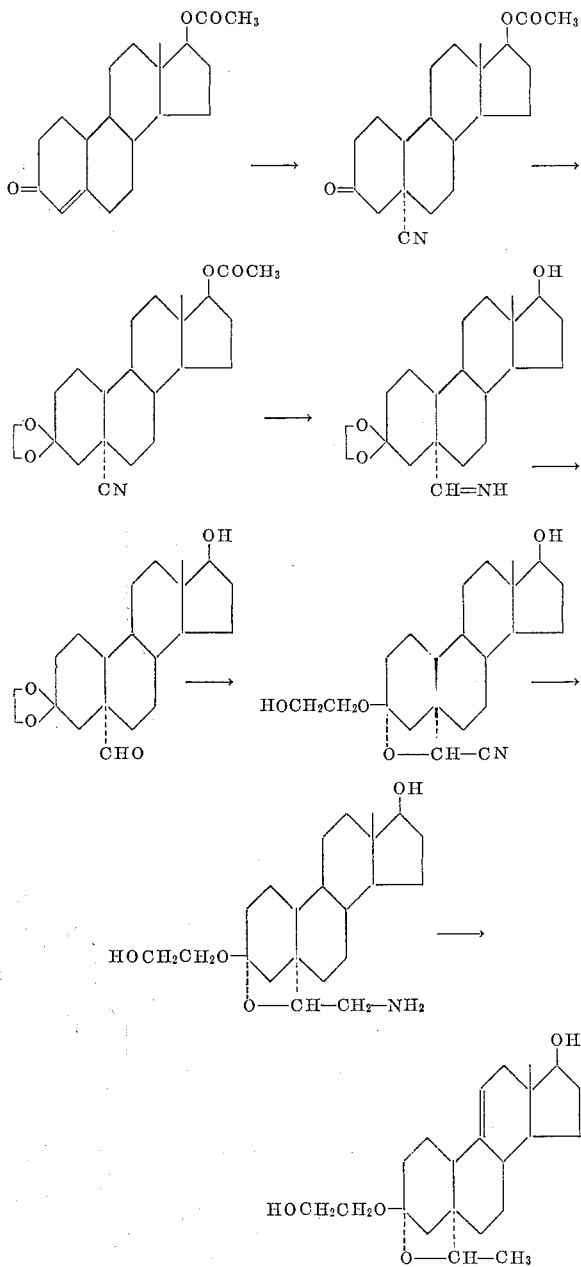

[A] Preparation of 5-cyano-17-acetyloxy-5α-estran-3-one: To a solution of 17β-acetyloxy-4-estren-3-one [Birch: J. Chem. Soc., p. 367 (1950)] (20.60 g.) in anhydrous tetrahydrofuran (30 ml.), there is added a solution of triethyl aluminum (18.6 g.) and hydrocyanic acid (2.65 g.) in anhydrous tetrahydrofuran (120 ml.) while cooling with ice, and the resultant mixture is allowed to stand at room temperature (10° to 30° C.) for 1 hour in a vessel provided with a tube of calcium chloride. The reaction mixture is dropwise added to 2 N sodium hydroxide solution (500 ml.) cooled with ice and then shaken with a mixture of chloroform and ether. The organic solvent layer is washed with dilute sodium hydroxide solution and water in order, dried over anhydrous sodium sulfate and the solvent evaporated. The residue is crystallized from acetone to give 5-cyano-17-acetyloxy-5-estran-3-one (14.5 g.) as crystals melting at 209° to 211° C.

I.R.: $\lambda_{max.}^{CHCl_3}$ 2244, 1724 cm.$^{-1}$

Analysis.—Calcd. for $C_{21}H_{29}O_3N$: C, 73.43; H, 8.51; N, 4.08. Found: C, 73.33; H, 8.43; N, 3.83.

[B] Preparation of 3,3 - ethylenedioxy - 5-cyano-17β-acetyloxy-5α-estrane: To a solution of 5-cyano-17β-acetyloxy-5α-estran-3-one (3.01 g.) in anhydrous benzene (150 ml.), there is added a mixture of ethylene glycol (1.4 ml.) and p-toluenesulfonic acid (180 mg.), and the resultant mixture is heated during which the benzene is gradually distilled out in 3 hours. After cooling, the reaction mixture is combined with 2 N sodium carbonate solution and shaken with chloroform. The chloroform layer is washed with water, dried over anhydrous sodium sulfate and the solvent evaporated. The residue is crystallized from a mixture of dichloromethane and methanol to give 3,3-ethylenedioxy-5-cyano-17β-acetyloxy-5-estrane (1.95 g.) as crystals melting at 230° to 233° C.

I.R.: $\lambda_{max.}^{CHCl_3}$ 2224, 1728 cm.$^{-1}$

Analysis.—Calcd. for $C_{23}H_{33}O_4N$: C, 71.29; H, 8.58; N, 3.61. Found: C, 71.08; H, 8.68; N, 3.30.

[C] Preparation of 3,3-ethylenedioxy-5-iminomethyl-5α-estran-17β-ol: A solution of 3,3-ethylenedioxy-5-cyano-17β-acetyloxy-5α-estrane (3.08 g.) in anhydrous tetrahydrofuran (30 ml.) is dropwise added to a solution of lithium aluminum hydride (3 g.) in anhydrous tetrahydrofuran (90 ml.) while cooling with ice, and the resultant mixture is stirred for 2 hours at room temperature (10° to 30° C.). The reaction mixture is combined with a small amount of 80% aqueous tetrahydrofuran and then poured into 2 N sodium hydroxide solution. The resultant mixture is shaken with chloroform. The chloroform layer is washed with water, dried over anhydrous sodium sulfate and the solvent evaporated. The residue is crystallized from methanol to give 3,3-ethylenedioxy-5-iminomethyl-5α-estran-17β-ol (2.14 g.) as crystals melting at 165° to 166° C.

I.R.: $\lambda_{max.}^{CHCl_3}$ 3626, 1632 cm.$^{-1}$

Analysis.—Calcd. for $C_{21}H_{33}O_3N$: C, 72.58; H, 9.57; N, 4.03. Found: C, 72.68; H, 9.67; N, 3.94.

[D] Preparation of 3,3-ethylenedioxy-5-formyl-5α-estran-17β-ol: A mixture of 3,3-ethylenedioxy-5-iminomethyl-5α-estran-17β-ol (1.24 g.), sodium acetate (492 mg.), tetrahydrofuran (10 ml.), methanol (10 ml.), acetic acid (1.36 ml.) and water (4 ml.) is refluxed for 5 minutes. After cooling, a solution of sodium hydroxide (1.1 g.) in water (4 ml.) is added thereto. The resulting mixture is shaken with dichloromethane. The dichloromethane layer is washed with water, dried over anhydrous sodium sulfate and the solvent evaporated. The residue is crystallized from a mixture of dichloromethane and methanol to give 3,3-ethylenedioxy-5-formyl-5α-estran-17β-ol (0.93 g.) as crystals melting at 182° to 186° C.

I.R.: $\lambda_{max.}^{CHCl_3}$ 3626, 3456, 2706, 1726, 1711 cm.$^{-1}$

Analysis.—Calcd. for $C_{21}H_{32}O_4$: C, 72.38; H, 9.26. Found: C, 72.34; H, 9.28.

[E] Preparation of 3β-(β-hydroxyethyloxy)-17β-hydroxy-3α,5α-epoxymethano-5α-estrane-5′-carbonitrile: To a solution of 3,3-ethylenedioxy-5-formyl-5α-estran-17β-ol (3.22 g.) in tetrahydrofuran (60 ml.), there is added a mixture of diethyl aluminum chloride (4.5 g.), hydrocyanic acid (0.72 ml.) and tetrahydrofuran (50 ml.), and the resultant mixture is allowed to stand at room temperature for 3 to 4 hours. The reaction mixture is combined with 2 N sodium carbonate solution while cooling with ice and shaken with dichloromethane. The dichloromethane layer is washed with water, dried and the solvent evaporated. The residue (3.20 g.) is crystallized from a mixture of methanol and ether to give 3β-(β-hydroxyethyloxy) - 17β-hydroxy-3α,5α-epoxymethano-5α- estrane-5′-carbonitrile (2.89 g.) as crystals melting at 198° to 201° C.

I.R.: $\lambda_{max.}^{CHCl_3}$ 3650, 3420 cm.$^{-1}$

Analysis.—Calcd. for $C_{22}H_{33}O_4N$: C, 70.37; H, 8.86; N, 3.73. Found: C, 70.51; H, 8.97; N, 3.91.

[F] Preparation of 3β - (β - hydroxyethyloxy) - 17β-hydroxy - 3α,5α - epoxymethano - 5α - estrane-5′-methylamine: To a solution of lithium aluminum hydride (1.4 g.) in tetrahydrofuran (80 ml.), there is dropwise added a solution of 3β-(β-hydroxyethyloxy)-17β-hydroxy-3α,5α-epoxymethano-5α-estrane-5′-carbonitrile (1.4 g.) in tetrahydrofuran (50 ml.) while stirring, and the resultant mixture is refluxed for 3 hours. The reaction mixture is combined with water and then filtered. The collected substance is washed with chloroform. The washing chloroform is combined with the filtrate, washed with water, dried over anhydrous sodium sulfate and the solvent evaporated. The residue is crystallized from a mixture of methanol and ether to give 3β-(β-hydroxyethyloxy)-17β-hydroxy-3α,5α-epoxymethano - 5α - estrane-5′-methylamine (796 mg.) as crystals melting at 202° to 207° C.

I.R.: $\lambda_{max.}^{CHCl_3}$ 3600, 3380, 1585 cm.$^{-1}$

Analysis.—Calcd. for $C_{22}H_{37}O_4N$: C, 69.62; H, 9.83; N, 3.69. Found: C, 69.05; H, 9.93; N, 4.16.

[G] Preparation of 3β-(β-hydroxyethyloxy)-5′-methyl-3α,5α-epoxymethano-5α-9(11)-estren-17β-ol: To a solution of 3β-(β-hydroxyethyloxy) - 17β - hydroxy-3α,5α-epoxymethano-5α-estrane-5′-methylamine (185 mg.) in a mixture of glacial acetic acid (0.5 ml.) and water (8 ml.), there is added a solution of sodium nitrite (70 mg.) in water (4 ml.) while cooling with ice, and the resultant mixture is allowed to stand at room temperature (10° to 30° C.) overnight. The reaction mixture is combined with water and shaken with dichloromethane. The dichloromethane layer is washed with 2 N sodium carbonate solution and the solvent evaporated. The residue (146 mg.) is dissolved in benzene (100 ml.) and poured onto a column with alumina. The eluate with dichloromethane-methanol is evaporated and the residue (136 mg.) crystallized from a mixture of methanol and ether to give 3β-(β-hydroxyethyloxy)-5′-methyl-3α,5α-epoxymethano-5α-9(11)-estren-17β-ol (103 mg.) as crystals melting at 180° to 183° C.

I.R.: $\lambda_{max.}^{CHCl_3}$ 3630 cm.$^{-1}$

Analysis.—Calcd. for $C_{22}H_{34}O_4$: C, 72.89; H, 9.45. Found: C, 72.76; H, 9.49.

In the similar manner, there are obtained other 3,3-(lower)alkylenedioxy-5-cyano-17β - (lower)alkanoyloxy-5α-estrane, 3,3-di(lower)alkoxy - 5 - cyano-17β-(lower) alkanoyloxy - 5α - estrane, 3,3 - (lower)alkylenedioxy-5-iminomethyl-5α-estrane-17β-ol, 3,3 - di(lower)alkoxy-5-iminomethyl-5α-estrane - 17β - ol, 3,3-(lower)alkylenedioxy-5′-formyl - 5α - estran-17β-ol, 3,3-di(lower)alkoxy-5′-formyl-5α-estran-17β-ol, 3β - (ω-hydroxy-(lower)alkoxy)-17α-hydroxy-3α,5α-epoxymethano-5α-estrane-5′ - carbonitrile, 3β - (lower)alkoxy - 17β - hydroxy - 3α,5α - epoxymethano-5α-estrane-5′-carbonitrile, 3β-(ω-hydroxy(lower)alkoxy)-17β-hydroxy-3α,5α-epoxymethano - 5α - estrane-5′-methylamine, 3β - (lower)alkoxy-17β-hydroxy-3α,5α-epoxymethano - 5α - estrane-5′-methylamine, 3β-(ω-hydroxy(lower)alkoxy)-5′-methyl - 3α,5α - epoxymethano-5α-9(11)-estren-17β-ol and 3β-(lower)alkoxy-5′-methyl-3α,5α-epoxymethano-5α-9(11)-estren-17β-ol.

EXAMPLE 3

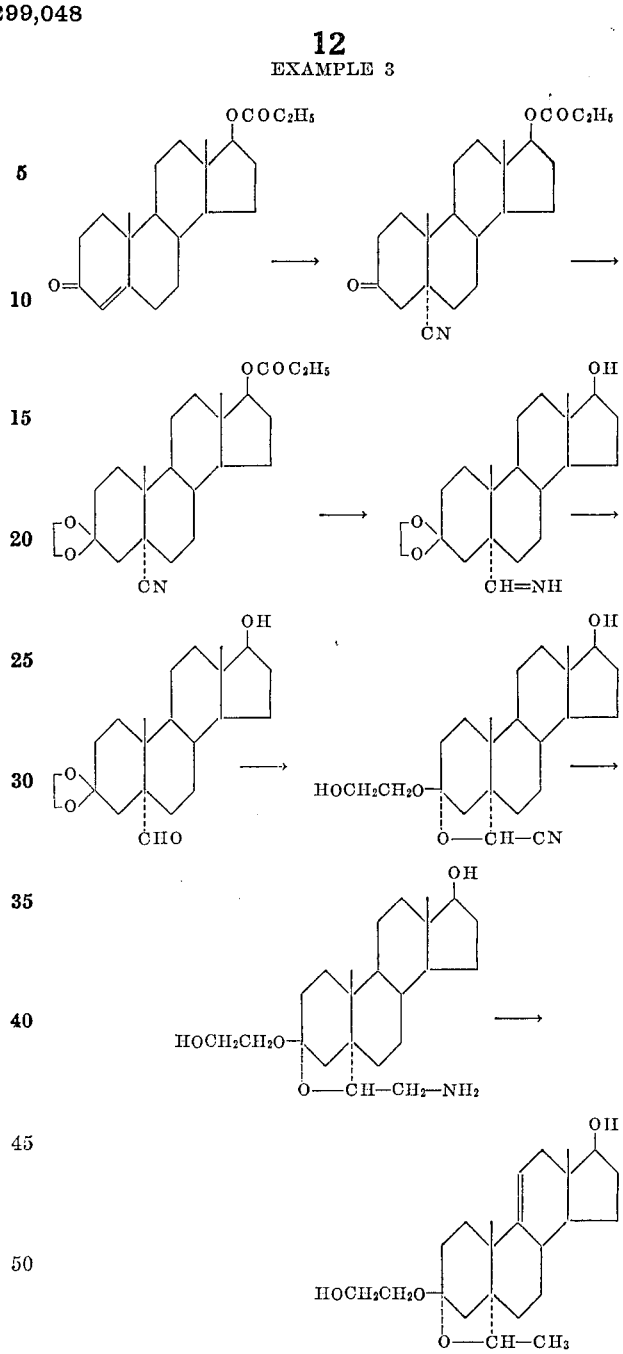

[A] Preparation of 5 - cyano - 17β - propionyloxy-5α - androstan - 3 - one: To a solution of 17β-propionyloxy-4-androsten-3-one [U.S. Patent 2,374,369] (34.5 g.) in anhydrous tetrahydrofuran (150 ml.), there is added a mixture of triethyl aluminum (28.5 g.), hydrocyanic acid (4.1 g.) and anhydrous tetrahydrofuran (150 ml.), and the resultant mixture is allowed to stand at room temperature (10° to 30° C.) for 4.5 hours. The reaction mixture is combined with a mixture of ice and sodium hydroxide solution and then stirred for 10 minutes. The resulting mixture is shaken with a mixture of dichloromethane and ether. The organic solvent layer is washed with water, dried over anhydrous sodium sulfate and the solvent evaporated. The residue is crystallized from a mixture of acetone and hexane to give 5-cyano-17β-propionyloxy-5α-androstan-3-one (11.3 g.) as crystals melting at 166° to 167.5° C.

I.R.: $\lambda_{max.}^{CHCl_3}$ 2340, 1721 cm.$^{-1}$

Analysis.—Calcd. for $C_{23}H_{33}O_3N$: C, 74.36; H, 8.95; N, 3.77. Found: C, 74.16; H, 9.05; N, 3.70.

[B] Preparation of 3,3-ethylenedioxy-5-cyano-17β-propionyloxy-5α-androstane: To a solution of 5-cyano-17β-propionyloxy-5α-androstan-3-one (4.73 g.) in anhydrous benzene (200 ml.), there are added ethylene glycol (2.13 ml.) and p-toluenesulfonic acid (237 mg.), and the resultant mixture is heated during which the benzene is gradually distilled out in 3 hours. After cooling, the reaction mixture is combined with 2 N sodium carbonate solution and shaken with chloroform. The chloroform layer is washed with water, dried over anhydrous sodium sulfate and the solvent evaporated. The residue is crystallized from acetone to give 3,3-ethylenedioxy-5-cyano-17β-propionyloxy-5α-androstane (4.6 g.) as crystals melting at 200° to 202° C.

I.R.: $\lambda_{max.}^{CHCl_3}$ 2236, 1738, 1085 cm.$^{-1}$

Analysis.—Calcd. for $C_{25}H_{37}O_4N$: C, 72.25; H, 8.98; N, 3.37. Found: C, 72.34; H, 9.01; N, 3.61.

[C] Preparation of 3,3-ethylenedioxy-5-iminomethyl-5α-androstan-17β-ol: A solution of 3,3-ethylenedioxy-5-cyano-17β-propionyloxy-5α-androstane (4.68 g.) in a mixture of anhydrous ether (100 ml.) and anhydrous tetrahydrofuran (100 ml.) is dropwise added to a solution of lithium aluminum hydride (2.5 g.) in anhydrous ether (100 ml.) while cooling with ice, and the resultant mixture is stirred for 4 hours at room temperature (10° to 30° C.). Water (6 ml.) is added thereto while cooling with ice. The separated substance is collected by filtration and washed with chloroform. The washing chloroform is combined with the filtrate, washed with water, dried over anhydrous sodium sulfate and the solvent evaporated. The residue is crystallized from methanol to give 3,3-ethylenedioxy-5-iminomethyl-5α-androstan-17β-ol (3.40 g.) as crystals melting at 157° to 158° C.

I.R.: $\lambda_{max.}^{CHCl_3}$ 3623, 1628, 1081 cm.$^{-1}$

Analysis.—Calcd. for $C_{22}H_{35}O_3N$: C, 73.09; H, 9.76. Found: C, 72.95; H, 9.83.

[D] Preparation of 3,3-ethylenedioxy-5-formyl-5α-androstan-17β-ol: A mixture of 3,3-ethylenedioxy-5-iminomethyl - 5α - androstan-17β-ol (3.36 g.), sodium acetate (1.29 g.), tetrahydrofuran (26 ml.), methanol (26 ml.), glacial acetic acid (3.6 ml.) and water (10.4 ml.) is refluxed for 5 minutes. The reaction mixture is combined with water and shaken with dichloromethane. The dichloromethane layer is washed with 2 N sodium carbonate solution and water in order, dried over anhydrous sodium sulfate and the solvent evaporated. The residue is crystallized from methanol to give 3,3-ethylenedioxy-5-formyl-5α-androstan-17β-ol (2.32 g.) as crystals melting at 180° to 189° C.

I.R.: $\lambda_{max.}^{CHCl_3}$ 3626, 1728, 1706, 1084 cm.$^{-1}$

Analysis.—Calcd. for $C_{22}H_{34}O_4$: C, 72.89; H, 9.45. Found: C, 73.39; H, 9.56.

[E] Preparation of 3β-(β-hydroxyethyloxy)-17β-hydroxy - 3α,5α - epoxymethano - 5α - androstane - 5' - carbonitrile: To a solution of 3,3-ethylenedioxy-5-formyl-5α-androstan-17β-ol (2.18 g.) in tetrahydrofuran (40 ml.), there is added a mixture of diethyl aluminum chloride (3.0 g.), hydrocyanic acid (0.48 ml.) and tetrahydrofuran (40 ml.), and the resultant mixture is allowed to stand at room temperature for 3 to 4 hours. The reaction mixture is combined with 2 N sodium carbonate solution while cooling with ice and shaken with chloroform. The chloroform layer is washed with water, dried and the solvent evaporated. The residue (2.45 g.) is crystallized from methanol to give 3β-(β-hydroxyethyloxy) - 17β-hydroxy - 3α,5α-epoxymethano-5α-androstane-5'-carbonitrile (1.95 g.) as crystals melting at 208° to 211° C.

I.R.: $\lambda_{max.}^{CHCl_3}$ 3640, 3620, 2242 cm.$^{-1}$

Analysis.—Calcd. for $C_{23}H_{35}O_4N \cdot CH_3OH$: C, 68.37; H, 9.33; N, 3.32. Found: C, 68.08; H, 9.48; N, 3.57.

When 3β-(β-hydroxyethyloxy) - 17β - hydroxy - 3α,5α-epoxymethano - 5α - androstane-5'-carbonitrile is acylated with acetic anhydride and pyridine in a per se conventional procedure, there is obtained 3β - (β - acetyloxyethyloxy)-17β-acetyloxy - 3α,5α - epoxymethano - 5α - androstane-5'-carbonitrile as crystals melting at 119° to 120° C. (crystallized from a mixture of methanol and ether).

[F] Preparation of 3β-(β-hydroxyethyloxy)-17β-hydroxy - 3α,5α - epoxymethano - 5 - androstane-5'-methylamine: A solution of 3β-(β-hydroxyethyloxy)-17β-hydroxy - 3α,5α - epoxymethano - 5α - androstane - 5' - carbonitrile (912 mg.) in ether (35 ml.) is dropwise added to a solution of lithium aluminum hydride (930 mg.) in ether (90 ml.), and the resultant mixture is stirred for 4 hours while refluxing. The reaction mixture is combined with water and then filtered. The collected substance is washed with chloroform. The washing chloroform is combined with the filtrate, washed with water, dried over anhydrous sodium sulfate and the solvent evaporated. The resultant oil (762 mg.) is dissolved in dichloromethane and shaken with 2 N hydrochloric acid. The hydrochloric acid layer is made alkaline with 2 N sodium carbonate solution and shaken with dichloromethane. The dichloromethane layer is washed with water, dried over anhydrous sodium sulfate and the solvent evaporated to give 3β-(β-hydroxyethyloxy) - 17β-hydroxy-3α,5α-epoxymethano-5α-androstane-5'-methylamine (618 mg.) as an oil.

[G] Preparation of 3β-(β-hydroxyethyloxy)-5'-methyl-3α,5α-epoxymethano - 5α-9(11) - androsten-17β-ol: To a solution of 3β-(β-hydroxyethyloxy)-17β-hydroxy-3α,5α-epoxymethano - 5α - androstane-5'-methylamine (752 mg.) in 50% acetic acid (12 ml.), there is added a solution of sodium nitrite (271 mg.) in water (9 ml.) while cooling with ice, and the resultant mixture is allowed to stand at room temperature (10° to 30° C.) overnight. The reaction mixture is combined with water and shaken with dichloromethane. The dichloromethane layer is washed with 2 N sodium carbonate solution and water in order, dried over anhydrous sodium sulfate and the solvent evaporated. The residue is crystallized from a mixture of methanol and ether to give 3β-(β-hydroxyethyloxy)-5'-methyl - 3α,5α - epoxymethano - 5α - 9(11) - androsten-17β-ol (374 mg.) as crystals melting at 245° to 248° C.

I.R.: $\lambda_{max.}^{CHCl_3}$ 3620, 3410 cm.$^{-1}$

Analysis.—Calcd. for $C_{23}H_{36}O_4$: C, 73.36; H, 9.64. Found: C, 73.21; H, 9.62.

In the similar manner, there are obtained other 3,3-(lower)alkylenedioxy-5-cyano-17β-(lower)alkanoyloxy-5α-androstane,
3,3-di(lower)alkoxy-5-cyano-17β-(lower)alkanoyloxy-5α-androstane,
3,3-(lower)alkylenedioxy-5-iminomethyl-5α-androstan-17β-ol,
3,3-di(lower)alkoxy-5-iminomethyl-5α-androstan-17β-ol,
3,3-(lower)alkylenedioxy-5-formyl-5α-androstan-17β-ol,
3,3-di(lower)alkoxy-5-formyl-5α-androstan-17β-ol,
3β-(ω-hydroxy(lower)alkoxy)-17β-hydroxy-3α,5α-epoxymethano-5α-androstane-5'-carbonitrile,
3β-(lower)alkoxy-17β-hydroxy-3α,5α-epoxymethano-5α-androstane-5'-carbonitrile,
3β-(ω-hydroxy(lower)alkoxy)-17β-hydroxy-3α,5α-epoxymethano-5α-androstane-5'-methylamine,
3β-(lower)alkoxy-17β-hydroxy-3α,5α-epoxymethano-5α-androstane-5'-methylamine,
3β-(ω-hydroxy(lower)alkoxy)-5'-methyl-3α,5α-epoxymethano-5α-9(11)-androsten-17β-ol and
3β-(lower)alkoxy-5'-methyl-3α,5α-epoxymethano-5α-9(11)-androsten-17β-ol.

EXAMPLE 4

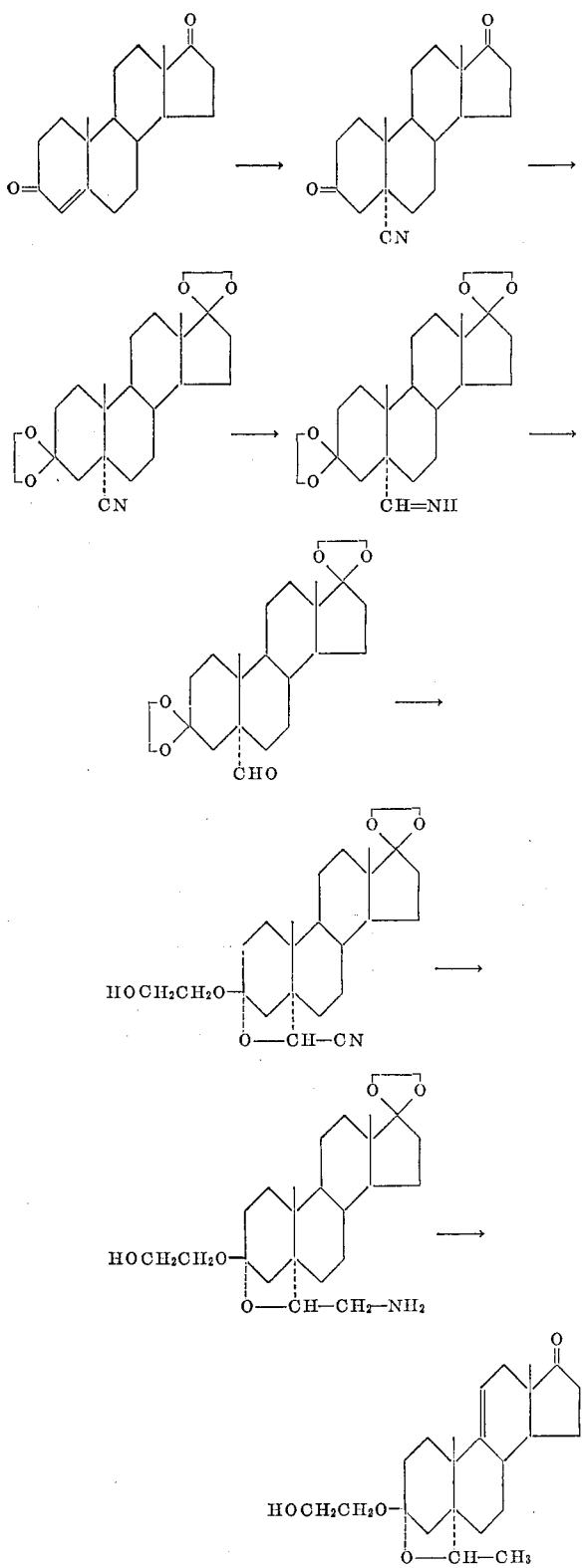

[A] Preparation of 5-cyano-5α-androstane-3,17-dione: To a solution of 4-androsten-3,17-dione [Ruzicka et al.: Helv. Chim. Acta, vol. 18, p. 986 (1935)] (9.92 g.) in tetrahydrofuran (50 ml.), there is added a mixture of triethyl aluminum (18.9 ml.), hydrocyanic acid (3.9 ml.) and tetrahydrofuran (70 ml.), and the resultant mixture is allowed to stand at room temperature (10° to 30° C.) for 4.5 hours. The reaction mixture is combined with a solution of sodium hydroxide (15.2 g.) in water (1000 ml.) and then shaken with chloroform. The chloroform layer is washed with water, dried over anhydrous sodium sulfate and the solvent evaporated. The residue is crystallized from acetone to give 5-cyano-5α-androstane-3,17-dione (4.62 g.) as crystals melting at 217° to 220° C.

I.R.: $\lambda_{max.}^{CHCl_3}$ 2240, 1735, 1720 cm.$^{-1}$

Analysis.—Calcd. for $C_{20}H_{27}O_2N$: C, 76.64; H, 8.68; N, 4.47. Found: C, 76.53; H, 8.67; N, 4.35.

[B] Preparation of 3,3,17,17-bisethylenedioxy-5-cyano-5α-androstane: To a solution of 5-cyano-5α-androstane-3,17-dione (4.53 g.) in anhydrous benzene (200 ml.), there are added ethylene glycol (3.23 ml.) and p-toluenesulfonic acid (450 mg.), and the resultant mixture is heated during which the benzene is gradually distilled out in 3 hours. After cooling, the reaction mixture is combined with 2 N sodium carbonate solution and shaken with ether. The ether layer is washed with water, dried over anhydrous sodium sulfate and the solvent evaporated. The residue is crystallized from a mixture of dichloromethane and methanol to give 3,3,17,17-bisethylenedioxy-5-cyano-5α-androstane (4.35 g.) as crystals melting at 216° to 220° C.

I.R.: $\lambda_{max.}^{CHCl_3}$ 2240, 1110 cm.$^{-1}$

Analysis.—Calcd. for $C_{24}H_{35}O_4N$: C, 71.79; H, 8.79; N, 3.49. Found: C, 71.90; H, 8.83; N, 3.58.

[C] Preparation of 3,3,17,17-bisethylenedioxy-5-iminomethyl-5α-androstane: A solution of 3,3,17,17-bisethylenedioxy-5-cyano-5α-androstane (5.23 g.) in a mixture of ether (100 ml.) and tetrahydrofuran (100 ml.) is dropwise added to a solution of lithium aluminum hydride (2.62 g.) in ether (100 ml.), and the resultant mixture is stirred for 4 hours at room temperature (10° to 30° C.). Water is added thereto while cooling with ice. The separated substance is collected by filtration and washed with chloroform. The washing chloroform is combined with the filtrate, washed with water, dried over anhydrous sodium sulfate and the solvent evaporated. The residue is crystallized from a mixture of dichloromethane and methanol to give 3,3,17,17-bisethylene-dioxy-5-iminomethyl-5α-androstane (4.57 g.) as crystals melting at 145° to 147° C.

I.R.: $\lambda_{max.}^{CHCl_3}$ 1628, 1103 cm.$^{-1}$

Analysis.—Calcd. for $C_{24}H_{37}O_4N$: C, 71.43; H, 9.24; N, 3.47. Found: C, 71.36; H, 9.30; N, 3.39.

[D] Preparation of 3,3,17,17-bisethylenedioxy-5-formyl-5α-androstane: A mixture of 3,3,17,17-bisethylenedioxy-5-iminomethyl-5α-androstane (4.54 g.), sodium acetate (1.57 g.), tetrahydrofuran (31.6 ml.), methanol (31.6 ml.), glacial acetic acid (4.35 ml.) and water (12.6 ml.) is refluxed for 5 minutes. The reaction mixture is combined with water and shaken with dichloromethane. The dichloromethane layer is washed with 2 N sodium carbonate solution and water in order, dried over anhydrous sodium sulfate and the solvent evaporated. The residue is crystallized from a mixture of dichloromethane and methanol to give 3,3,17,17-bisethylenedioxy-5-formyl-5α-androstane (3.78 g.) as crystals melting at 155° to 163° C.

I.R.: $\lambda_{max.}^{CHCl_3}$ 1728, 1706, 1103 cm.$^{-1}$

Analysis.—Calcd. for $C_{24}H_{36}O_5$: C, 71.25; H, 8.97. Found: C, 71.17; H, 8.99.

[E] Preparation of 3β - (β - hydroxyethyloxy) - 17,17 - ethylenedioxy - 3α,5α - epoxymethano - 5α - androstane-5'-carbonitrile: To a solution of 3,3,17,17-bisethylenedioxy-5-formyl-5α-androstane (3.61 g.) in tetrahydrofuran (35 ml.), there is added a mixture of diethyl aluminum chloride (4.5 g.), hydrocyanic acid (0.75 ml.) and tetrahydrofuran (80 ml.), and the resultant mixture is allowed to stand at room temperature for 3 hours. The reaction mixture is combined with 2 N sodium carbonate solution and shaken with chloroform. The chloroform layer is washed with water, dried over anhydrous sodium sulfate and the solvent evaporated to give 3β-(β-hydroxyethyloxy) - 17,17 - ethylenedioxy - 3α,5α-epoxymethano - 5α - androstane - 5' - carbonitrile (3.25 g.) as an oil.

When 3β - (β - hydroxyethyloxy) - 17,17 - ethylenedioxy - 3α,5α - epoxymethano - 5α - androstane - 5'-carbonitrile is acylated with acetic anhydride and pyridine in a per se conventional procedure, there is obtained 3β - (β - acetyloxyethyloxy) - 17,17 - ethylenedioxy-3α,5α - epoxymethano - 5α - androstane - 5' - carbonitrile as crystals melting at 175° to 176° C. (crystallized from a mixture of methanol and ether).

[F] Preparation of 3β - (β - hydroxyethyloxy - 17,17-ethylenedioxy - 3α,5α - epoxymethanol - 5α - androstane-5'-methylamine: A solution of 3β-(β-hydroxyethyloxy)-17,17 - ethylenedioxy - 3α,5α - epoxymethano - 5α - androstane-5'-carbonitrile (3.26 g.) in a mixture of tetrahydrofuran (40 ml.) and ether (90 ml.) is dropwise added to a suspension of lithium aluminum hydride (3.29 g.) in ether (150 ml.), and the resultant mixture is refluxed for 3 hours. The reaction mixture is combined with water and then filtered. The collected substance is washed with dichloromethane. The washing dichloromethane is combined with the filtrate, washed with water, dried over anhydrous sodium sulfate and the solvent evaporated. The residue is crystallized from a mixture of dichloromethane and methanol to give 3β-(β-hydroxyethyloxy) - 17,17 - ethylenedioxy - 3α,5α - epoxymethano-5α - androstane - 5' - methylamine (2.43 g.) as crystals melting at 215° to 219° C.

I.R.: $\lambda_{max.}^{CHCl_3}$ 3603, 3393, 1587 cm.$^{-1}$

Analysis.—Calcd. for $C_{25}H_{41}O_5N$: C, 68.93; H, 9.49; N, 3.22. Found: C, 68.35; H, 9.47; N, 3.24.

[G] Preparation of 3β - (β - hydroxyethyloxy) - 5'-methyl - 3α,5α - epoxymethano - 5α - 9(11) - androsten-17-one: To a solution of 3β - (β - hydroxyethyloxy)-17,17-ethylenedioxy - 3α,5α - epoxymethano - 5α - androstane-5'-methylamine (2.02 g.) in 50% acetic acid (25 ml.), there is added a solution of sodium nitrite (102 mg.) in water (10 ml.) while cooling with ice, and the resultant mixture is allowed to stand at room temperature (10° to 30° C.) overnight. The reaction mixture is combined with water and shaken with dichloromethane. The dichloromethane layer is washed with 2 N sodium carbonate solution and water in order, dried over anhydrous sodium sulfate and the solvent evaporated to give (3β - (β - hydroxyethyloxy) - 5' - methyl - 3α,5α-epoxymethano - 5α - 9(11) - androsten - 17 - one (1.91 g.) as an oil.

When 3β - (β - hydroxyethyloxy) - 5' - methyl - 3α,5α-epoxymethano-5α-9(11)-androsten-17-one is ketalated with ethylene glycol, p-toluenesulfonic acid and benzene in a per se conventional procedure, there is obtained 3β-(β - hydroxyethyloxy) - 17,17 - ethylenedioxy - 5'-methyl - 3α,5α - epoxymethano - 5α - 9(11) - androstene as crystals melting at 140° to 142° C. (crystallized from ether).

In the similar manner, there are obtained other 3,3,17,17-bis(lower)alkylenedioxy-5-cyano-5-α-androstane, 3,3,17,17-tetra(lower)alkoxy-5-cyano-5α-androstane, 3,3,17,17-bis(lower)alkylenedioxy-5-iminomethyl-5-α-androstane, 3,3,17,17-tetra(lower)alkoxy-5-iminomethyl-5α-androstane, 3,3,17,17-bis(lower)alkylenedioxy-5-formyl-5α-androstane, 3,3,17,17-tetra(lower)alkoxy-5-formyl-5α-androstane, 3β-(ω-hydroxy(lower)alkoxy)-17,17-(lower)alkylenedioxy-3α,5α-epoxymethano-5α-androstane-5'-carbonitrile, 3β,17,17-tri(lower)alkoxy-3α,5α-epoxymethano-5α-androstane-5'-carbonitrile, 3β-(ω-hydroxy(lower)alkoxy)-17,17-(lower)alkylenedioxy-3α,5α-epoxymethano-5α-androstane-5'-methylamine, 3β-17,17-tri(lower)alkoxy-3α,5α-epoxymethano-5α-androstane-5'-methylamine, 3β-(ω-hydroxy(lower)alkoxy)-5'-methyl-3α,5α-epoxymethano-5α-9(11)-androsten-17-one and 3β-(lower)alkoxy-5'-methyl-3α,5α-epoxymethano-5α-9(11)-androsten-17-one.

EXAMPLE 5

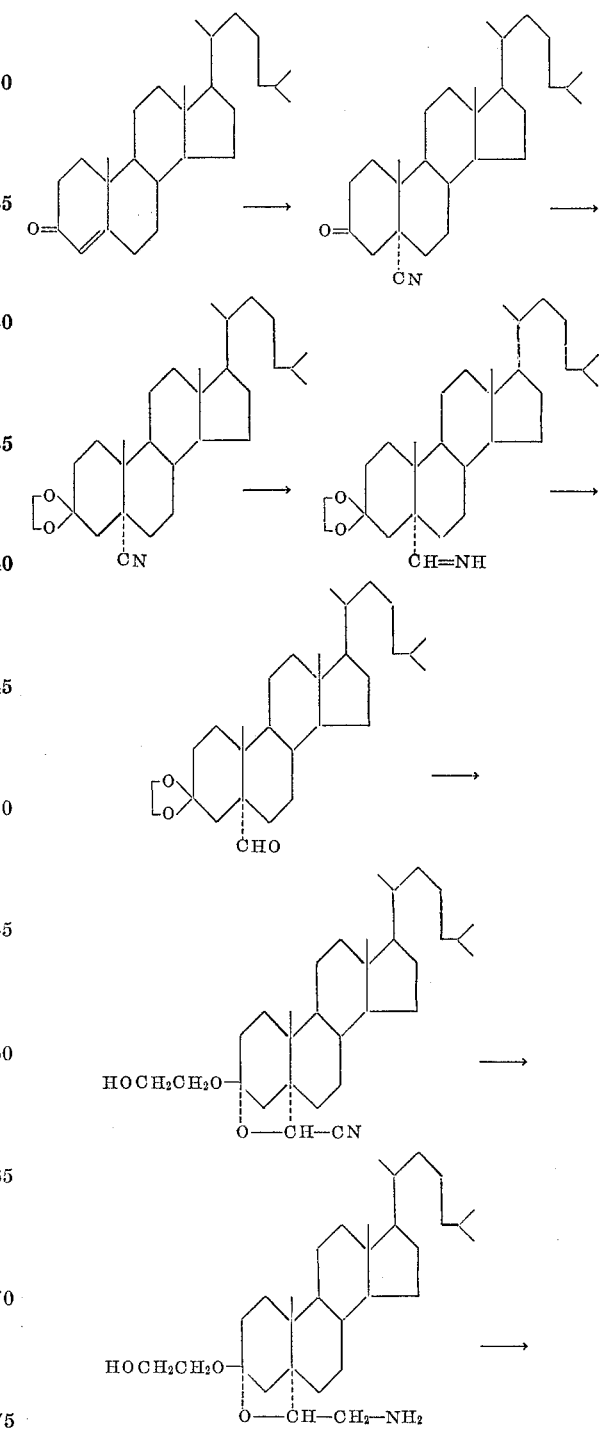

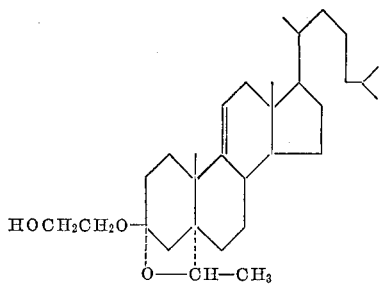

[A] Preparation of 5-cyano-5α-cholestan-3-one: To a solution of 4-cholesten-3-one [Butenandt et al.: Chem. Ber., vol. 69, p. 882 (1936)] (10 g.) in anhydrous tetrahydrofuran (50 ml.), there are added a solution of hydrocyanic acid (1.05 g.) in anhydrous tetrahydrofuran (20 ml.) and a solution of triethyl aluminum (8.9 g. in anhydrous tetrahydrofuran (125 ml.) while cooling with ice, and the resultant mixture is allowed to stand at room temperature (10° to 30° C.) for 3 hours in nitrogen atmosphere. The reaction mixture is gradually added to 2 N sodium hydroxide solution (100 ml.) and shaken with ether. The ether extract is washed with 2 N hydrochloric acid and water in order, dried over anhydrous sodium sulfate and the solvent removed. The residue (11.2 g.) is crystallized from ethanol to give 5-cyano-5α-cholestan-3-one (3.67 g.) as crystals melting at 170° to 180° C. The mother liquor is chromatographed on alumina to give additional crystals (4.84 g.) of 5-cyano-5α-cholestan-3-one.

[B] Preparation of 3,3-ethylenedioxy-5-cyano-5α-cholestane: A mixture of 5-cyano-5α-cholestan-3-one (3 g.), ethylene glycol (2.4 g.), p-toluenesulfonic acid monohydrate (0.15 g.) and anhydrous benzene (150 ml.) is heated for 7 hours during which water is eliminated as an azeotropic mixture. The reaction mixture is combined with water (30 ml.). The benzene layer is washed with 2 N sodium carbonate solution and water in order, dried over anhydrous sodium sulfate and the solvent evaporated. The residue (3.41 g.) is crystallized from ether to give 3,3-ethylenedioxy-5-cyano-5α-cholestane (2.42 g.) as crystals melting at 13° to 16° C.

I.R.: $\nu_{max.}^{Nujol}$ 2245, 1116 cm.$^{-1}$

Analysis.—Calcd. for $C_{30}H_{49}NO_2$: C, 79.07; H, 10.84; N, 3.07. Found: C, 79.26; H, 10.80; N, 3.20.

[C] Preparation of 3,3-ethylenedioxy-5-iminomethyl-5α-cholestane: To a suspension of lithium aluminum hydride (300 mg.) in anhydrous ether (15 ml.), there is dropwise added a solution of 3,3-ethylenedioxy-5-cyano-5α-cholestane (300 mg.) in anhydrous ether (15 ml.) while cooling with ice, and the resultant mixture is stirred for 2 hours at room temperature (10° to 30° C.). A solution of tartaric acid in water is added to the reaction mixture whereby the reducing agent is decomposed. The resulting mixture is neutralized with 2 N sodium carbonate solution. The ether layer is separated, washed with water, dried over anhydrous sodium sulfate and the solvent evaporated. The residue is crystallized from methanol to give 3,3-ethylenedioxy-5-iminomethyl-5α-cholestane (256 mg.) as crystals melting at 139° to 140° C.

[D] Preparation of 3,3-ethylenedioxy-5-formyl-5α-cholestane: A mixture of 3,3-ethylenedioxy-5-iminomethyl-5α-cholestane (412 mg.), sodium acetate (170 mg.), tetrahydrofuran (4 ml.), methanol (3 ml.), glacial acetic acid (0.5 ml.) and water (1.3 ml.) is refluxed for 5 minutes. The reaction mixture is neutralized with sodium hydroxide solution and shaken with dichloromethane. The dichloromethane layer is washed with water, dried over anhydrous sodium sulfate and the solvent evaporated. The residue is crystallized from ether to give 3,3-ethylenedioxy-5-formyl-5α-cholestane (381 mg.) as crystals melting at 115° to 117° C.

I.R.: $\nu_{max.}^{Nujol}$ 2704, 1734, 1712, 1111, 1094 cm.$^{-1}$

Analysis.—Calcd. for $C_{30}H_{50}O_3$: C, 78.55; H, 10.99; Found: C, 78.51; H, 10.95.

[E] Preparation of 3β-(β-hydroxyethyloxy)-3α,5α-epoxymethano-5α-cholestane-5′-carbonitrile: To a solution of 3,3-ethylenedioxy-5-formyl-5α-cholestane (4.5 g.) in tetrahydrofuran (25 ml.), there is added a mixture of diethyl aluminum chloride (6 ml.), hydrocyanic acid (0.8 ml.) and tetrahydrofuran (25 ml.) while cooling with ice, and the resultant mixture is allowed to stand at room temperature (10° to 30° C.) for 2.5 hours in a flask with a stopper. The reaction mixture is added to 2 N hydrochloric acid while cooling with ice and shaken with ether. The ether layer is washed with water, dried over anhydrous sodium sulfate and the solvent evaporated. The residue (4.5 g.) is crystallized from methanol to give 3β-(β-hydroxyethyloxy) - 3α,5α - epoxymethano-5α-cholestane-5′-carbonitrile (3.65 g.) as crystals melting at 116° to 120° C.

I.R.: $\nu_{max.}^{CHCl_3}$ 3650, 1034 cm.$^{-1}$

Analysis.—Calcd. for $C_{31}H_{51}O_3N$: C, 76.65; H, 10.58; N, 2.88. Found: C, 76.81; H, 10.71; N, 2.84.

[F] Preparation of 3β - (β - hydroxyethyloxy)-3α,5α-epoxymethano-5α-cholestane - 5′ - methylamine: A solution of 3β-(β-hydroxyethyloxy)-3α,5α-epoxymethano-5α-cholestane-5′-carbonitrile (1.36 g.) in anhydrous tetrahydrofuran (35 ml.) is dropwise added a suspension of lithium aluminum hydride (1.5 g.) in anhydrous tetrahydrofuran (30 ml.), and the resultant mixture is refluxed for 2.5 hours. The reaction mixture is cooled with ice, combined with water (10 ml.) and filtered with suction. The collected cake is washed with chloroform. The washing chloroform is combined with the filtrate, washed with water, dried and the solvent evaporated. The residue is crystallized from ether and recrystallized from a mixture of methanol and chloroform to give 3β-(β-hydroxyethyloxy)-3α,5α-epoxymethano - 5α - cholestane-5′-methylamine (710 mg.) as crystals melting at 166° to 170° C.

I.R.: $\nu_{max.}^{CHCl_3}$ 3500–3400, 1590, 1082, 1061, 1016 cm.$^{-1}$

Analysis.—Calcd. for $C_{31}H_{55}O_3N$: C, 76.02; H, 11.32; N, 2.86. Found: C, 75.50; H, 11.29; N, 2.91.

[G] Preparation of 3β-(β-hydroxyethyloxy)-5′-methyl-3α,5α-epoxymethano-5α-9(11)-cholestene: To a solution of 3β-(β-hydroxyethyloxy)-3α,5α-epoxymethano-5α-cholestane-5′-methylamine (1.74 g.) in a mixture of tetrahydrofuran (30 ml.), glacial acetic acid (6 ml.) and water (4 ml.), a solution of sodium nitrite (490 mg.) in water (5 ml.) is dropwise added while cooling with ice, and the resultant mixture is allowed to stand at room temperature (10° to 30° C.) overnight. The reaction mixture is concentrated under reduced pressure at room temperature (10° to 30° C.) to about half volume and shaken with chloroform. The chloroform layer is washed with 2 N potassium carbonate solution while cooling with ice and water in order, dried and the solvent evaporated to give 3β-(β-hydroxyethyloxy)-5′-methyl-3α,5α-epoxymethano-5α-9(11)-cholestene (1.71 g.) as an yellowish oil.

In the similar manner, there are obtained other 3,3-(lower)alkylenedioxy-5-cyano-5α-cholestane, 3,3 - (lower)-alkylenedioxy-5-iminomethyl-5α-cholestane, 3,3-(lower)alkylenedioxy-5-formyl-5α-cholestane, 3β-(ω-hydroxy(lower)alkoxy)-3α,5α - epoxymethano-5α - cholestane-5′-carbonitrile, 3β-(ω-hydroxy(lower)alkoxy)-3α,5α-epoxymethano-5α-cholestane-5′-carbonitrile and 3β-(ω-hydroxy(lower)alkoxy)-5′-methyl - 3α,5α - epoxymethano - 5α-9(11)-cholestene.

EXAMPLE 6

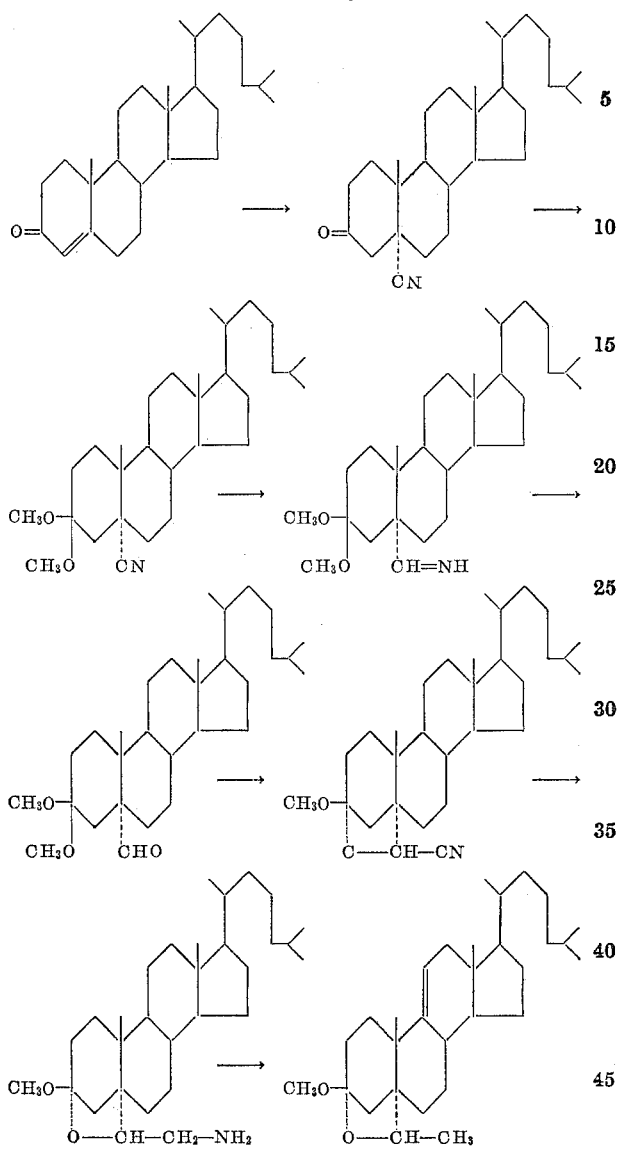

[A] Preparation of 5-cyano-5α-cholestan-3-one: 4-cholesten-3-one is subjected to hydrocyanation using hydrocyanic acid and triethyl aluminum as in Example 5 [A] whereby 5-cyano-5α-cholestan-3-one is obtained.

[B] Preparation of 3,3-dimethoxy-5-cyano-5α-cholestane: 5-cyano-5α-cholestan-3-one is subjected to ketalation using methanol and acetic acid whereby 3,3-dimethoxy-5-cyano-5α-cholestane is obtained.

[C] Preparation of 3,3-dimethoxy-5-iminomethyl-5α-cholestane: 3,3-dimethoxy-5-cyano-5α-cholestane is subjected to reduction using lithium aluminum hydride as in Example 5 [C] whereby 3,3-dimethoxy-5-iminomethyl-5α-cholestane is obtained.

[D] Preparation of 3,3-dimethoxy-5-formyl-5α-cholestane: 3,3-dimethoxy-5-iminomethyl-5α-cholestane is subjected to hydrolysis using sodium acetate and acetic acid as in Example 5 [D] whereby 3,3-dimethoxy-5-formyl-5α-cholestane is obtained.

[E] Preparation of 3β-methoxy-3α,5α-epoxymethano-5α-cholestane-5'-carbonitrile: 3,3-dimethoxy-5-formyl-5α-cholestane is subjected to hydrocyanation using hydrocyanic acid and diethyl aluminum chloride as in Example 5 [E] whereby 3β-methoxy-3α,5α-epoxymethano-5α-cholestane-5'-carbonitrile is obtained as crystals melting at 138° to 141° C. (crystallized from a mixture of chloroform and methanol).

[F] Preparation of 3β-methoxy-3α,5α-epoxymethano-5α-cholestane-5'-methylamine: 3β-methoxy-3α,5α-epoxymethano-5α-cholestane-5'-carbonitrile is subjected to reduction using lithium aluminum hydride as in Example 5 [F] whereby 3β-methoxy-3α,5α-epoxymethano-5α-cholestane-5'-methylamine is obtained as an oil.

[G] Preparation of 3β-methoxy-5'-methyl-3α,5α-epoxymethano-5α-9(11)-cholestene: 3β-methoxy-3α,5α-epoxymethano-5α-cholestane-5'-methylamine is subjected to diazotization using sodium nitrite and acetic acid as in Example 5 [G] whereby 3β-methoxy-5'-methyl-3α,5α-epoxymethano-5α-9(11)-cholestene is obtained as an oil.

In the similar manner, there are obtained other 3,3-di(lower)alkoxy-5-cyano-5α - cholestane, 3,3 - di(lower)alkoxy-5-iminomethyl-5α-cholestane, 3,3 - di(lower)alkoxy-5-formyl-5α-cholestane, 3β-(lower)alkoxy-3α,5α-epoxymethano-5α-cholestane-5'-carbonitrile, 3β-(lower)alkoxy-3α,5α-epoxymethano - 5α-cholestane-5'-methylamine and 3β-(lower)alkoxy-5'-methyl-3α,5α-epoxymethano-5α-9(11)-cholestene.

As stated above, the methyl-3α,5α-epoxymethanosteroid (VIII) prepared by the process of the present invention is useful as an intermediate in the synthesis of the corresponding Δ⁴-3-oxo-steroid having a double bond between the 9- and 11-positions. For instance, 3β-(β-hydroxyethyloxy) - 5' - methyl - 3α,5α-epoxymethano-5α-9(11)-pregnen-20-one obtained in Example 1 can be converted into 4,9(11)-pregnadiene-3,20-dione according to the following scheme:

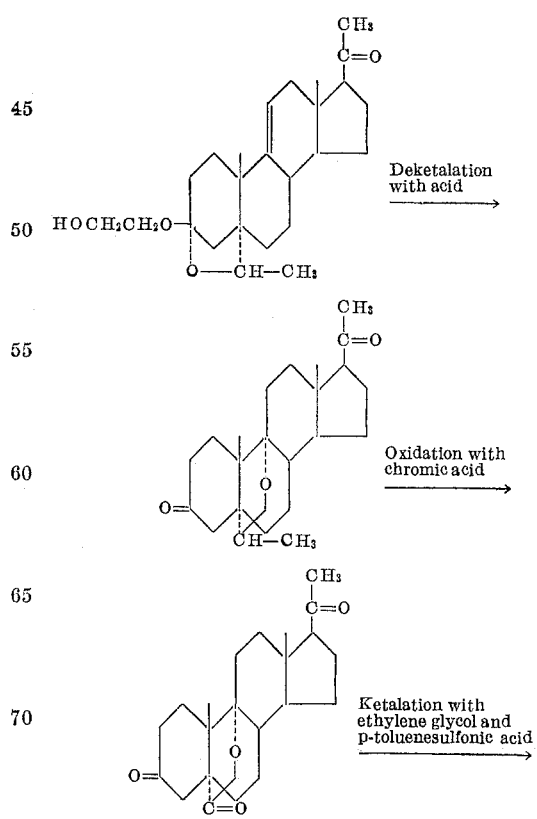

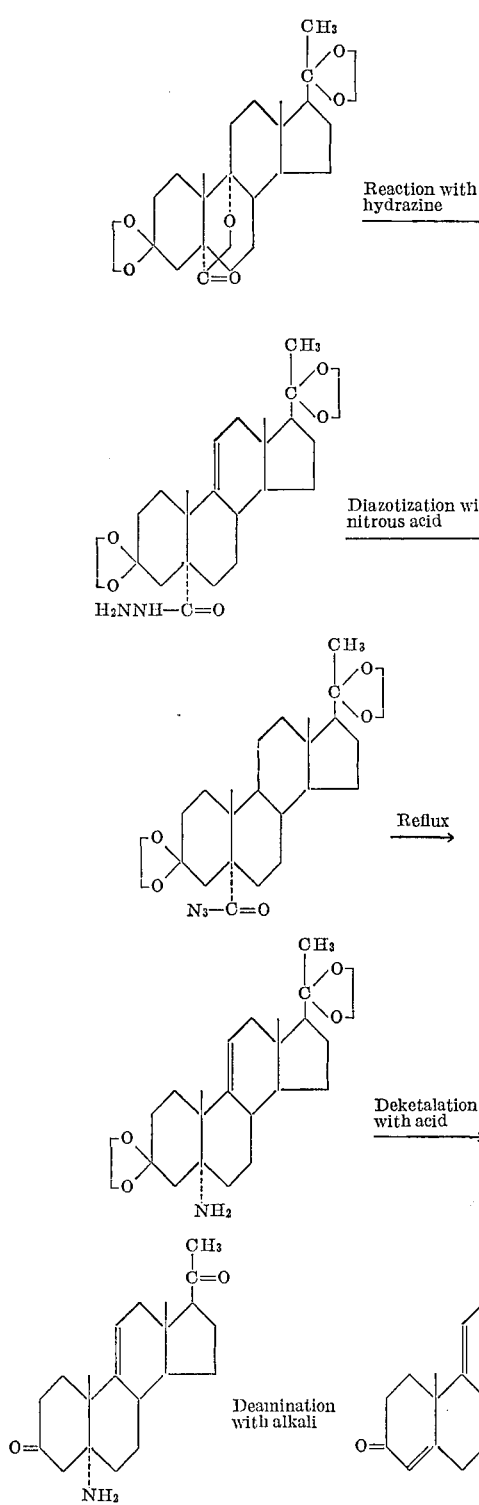

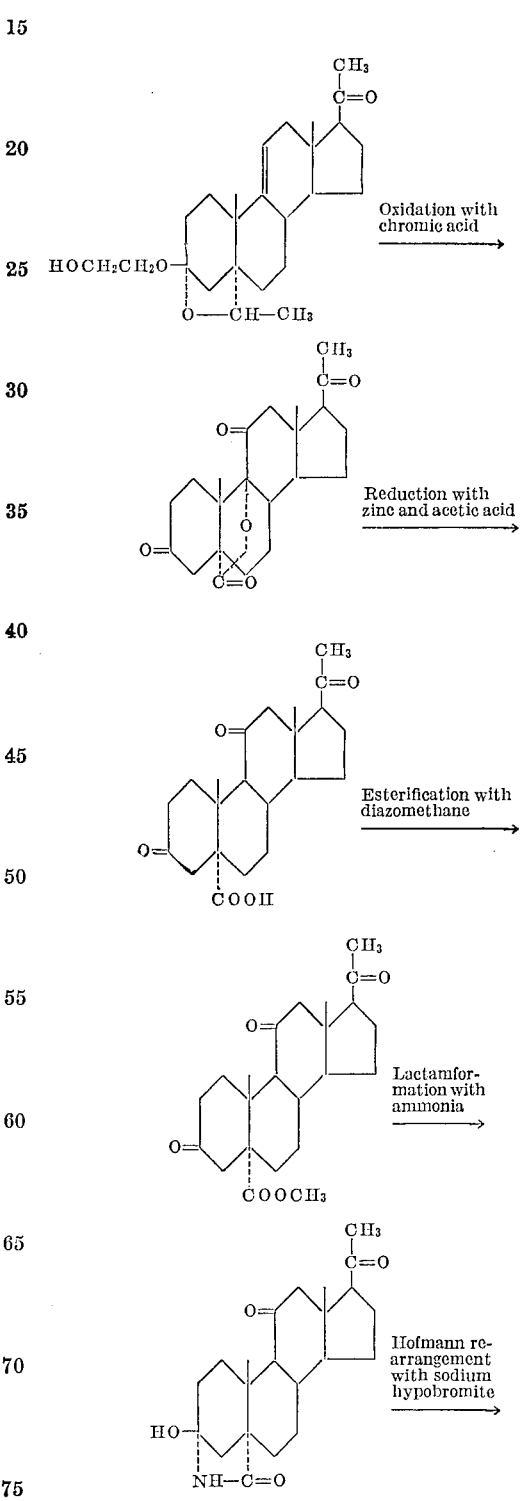

In the similar manner, 3β-(β-hydroxyethyloxy)-5′-methyl-3α,5α-epoxymethano-5α-9(11)-estren-17β-ol obtained in Example 2, 3β-(β-hydroxyethyloxy)-5′-methyl-3α,5α-epoxymethano-5α-9(1)-androsten-17β-ol obtained in Example 3, 3β-(β-hydroxyethyloxy-5′-methyl-3α,5α-epoxymethano-5α-9(11)-androsten-17-one obtained in Example 4, 3β-(β-hydroxyethyloxy)-5′-methyl - 3α,5α - epoxymethano-5α-9(11)-cholestene obtained in Example 5 and 3β-methoxy - 5′ - methyl - 3α,5α - epoxymethano - 5α-9(11)-cholestene obtained in Example 6 are converted into 17β-hydroxy-4,9(11)-estradien-3-one, 17β - hydroxy-4,9(11)-androstadien - 3 - one, 4,9(11)-androstadiene-3,17-dione, 4,9(11)-cholestadien-3-one and 4,9(11)-chloestadien-3- one, respectively. These 9(11)-unsaturated steroids are, as well known, useful as intermediates in the production of the corresponding 11-hydroxy- or 11-oxo-steroids.

In alternative, the methyl-3α,5α-epoxymethano-steroid (VIII) prepared by the present process may be converted into the corresponding Δ⁴-3-oxo-steroid having an oxo group at the 11-position by a shorter route. For instance, 3β - (β-hydroxyethyloxy)-5′-methyl-3α,5α-epoxymethano-5α-9(11)-pregnen-20-one obtained in Example 1 is changed to 3-pregnene-3,11,20-trione according to the following scheme:

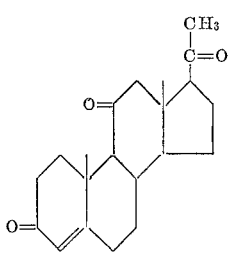

In the similar manner, 3β-(β-hydroxyethyloxy)-5'-methyl-3α,5α-epoxymethano-5α-9(11)-estren-17β-ol obtained in Example 2, 3β - (β - hydroxyethyloxy)-5'-methyl-3α,5α epoxy-methano-5α-9(11)-androsten-17β-ol obtained in Example 3, 3β - (β - hydroxyethyloxy)-5'-methyl-3α,5α-epoxymethano-5α-9(11)-androsten-17-one obtained in Example 4, 3β-(β-hydroxyethyloxy)-5'-methyl-3α,5α-epoxymethano-5α-9(11)-cholestene obtained in Example 5 and 3β-methoxy-5'-methyl-3α,5α-epoxymethano - 5α - 9(11)-cholestene obtained in Example 6 are changed to 17β-hydroxy-4-estrene-3,11-dione, 17β-hydroxy-4-androstene-3,11-dione, 4-androstene-3,11,17-trione, 4-cholestene-3,11-dione and 4-cholestene-3,11-dione, respectively.

What is claimed is:

1. A process for formation of a double bond in steroids which comprises: (1) treating a 9,11-saturated Δ⁴-3-oxosteroid having a structure represented by the formula:

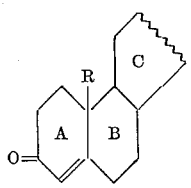

wherein R is a member selected from the group consisting of hydrogen and methyl substantially with a complex anion represented by the formula:

[AlYY'Y''CN]⁻ wherein Y is a member selected from the group consisting of lower alkyl and lower alkoxy and Y' and Y'' each is a member selected from the group consisting of lower alkyl, lower alkoxy, halogen and cyano in a substantially anhydrous medium; (2) treating the resultant 9,11-saturated 3-oxo-5α-cyanosteroid having a structure represented by the formula:

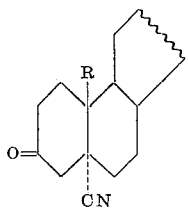

wherein R has the same significance as designated above with a member selected from the group consisting of lower alkanol and lower alkylene glycol in the presence of an acidic catalyst; (3) treating the resultant 9,11-saturated 3-ketalated oxo-5α-cyano-steroid having a structure represented by the formula:

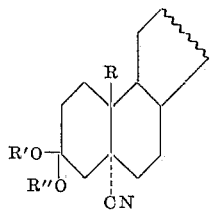

wherein R' and R'' each is lower alkyl and, when linked together, they represent lower alkylene and R has the same significance as designated above with a metal hydride in a substantially anhydrous inert solvent; (4) treating the resultant 9-11-saturated 3-ketalated oxo-5α-iminomethyl-steroid having a structure represented by the formula:

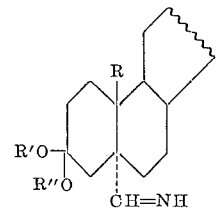

wherein R, R' and R'' each has the same significance as designated above with a member selected from the group consisting of acidic substance and basic substance in an aqueous medium; (5) treating the resultant 9-11-saturated 3-ketalated oxo-5α-formyl-steroid having a structure represented by the formula:

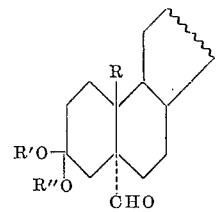

wherein R, R' and R'' each has the same signifiance as designated above substantially with a complex anion represented by the formula:

[AlYY'Y''CN]⁻ wherein Y, Y' and Y'' each has the same significance as designated above in a substantially anhydrous medium; (6) treating the resultant 9,11-saturated 5'-cyano-3α,5α-epoxy-methano-steroid having a structure represented by the formula:

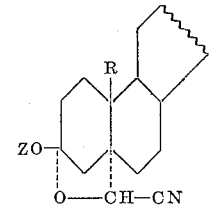

wherein Z is a member selected from the group consisting of lower alkyl and ω-hydroxy(lower)alkyl and R has the same significance as designated above with a metal halide in a substantially anhydrous inert solvent; and (7) treating the resultant 9,11-saturated 5'-aminomethyl-3α,5α-epoxymethano-steroid having a structure represented by the formula:

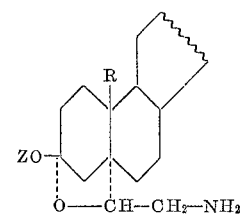

wherein R and Z each has the same significance as designated above substantially with nitrous acid in an aqueous medium to give the corresponding 9,11-unsaturated 5'- methyl-3α,5α-epoxymethano-steroid having a structure represented by the formula:

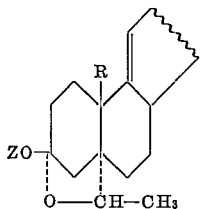

wherein R and Z each has the same significance as designated above.

2. A process for formation of a double bond in steroids which comprises treating a 9,11-saturated 5'-aminomethyl-3α,5α-epoxymethano-steroid having a structure represented by the formula:

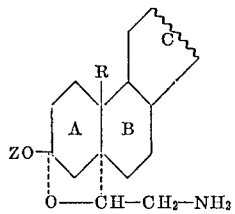

wherein R is a member selected from the group consisting of hydrogen and methyl and Z is a member selected from the group consisting of lower alkyl and ω-hydroxy(lower)alkyl substantially with nitrous acid to give the corresponding 9,11-unsaturated 5'-methyl-3α,5α-epoxymethano-steroid having a structure represented by the formula:

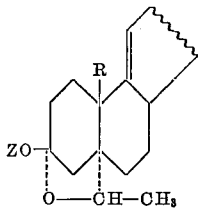

wherein R and Z each has the same significance as designated above.

3. The process according to claim 2, wherein the reaction is carried out using an alkali nitrite and an acid in an aqueous medium.

4. The process according to claim 2, wherein the reaction is carried out at a temperature from 0° C. to room temperature.

5. 3,3,20,20 - bisethylenedioxy - 5 - iminomethyl - 5α-pregnane.

6. 3,3 - ethylenedioxy-5-iminomethyl-5α-estran-17β-ol.

7. 3,3-ethylenedioxy-5-iminomethyl-5α-androstan - 17β-ol.

8. 3,3,17,17 - bisethylenedioxy - 5 - iminomethyl - 5α-androstane.

9. 3,3-dimethoxy-5-iminomethyl-5α-cholestane.

10. 3,3,20,20-bisethylenedioxy-5-formyl - 5α - pregnane.

11. 3,3-ethylenedioxy-5-formyl-5α-estran-17β-ol.

12. 3,3 - ethylenedioxy - 5 - formyl - 5α - androstan-7β - ol.

13. 3,3,17,17 - bisethylenedioxy - 5 - formy - 5α - androstane.

14. 3,3 - dimethoxy - 5 - formyl - 5α - cholestane.

15. 3β - (β - hydroxyethyloxy) - 20,20 - ethylenedioxy-3α,5α - epoxymethano - 5α - pregnane - 5' - carbonitrile.

16. 3β - (β - hydroxyethyloxy) - 17β - hydroxy - 3α,5α-epoxymethano - 5α - estrane - 5' - carbonitrile.

17. 3β - (β - hydroxyethyloxy) - 17β - hydroxy - 3α,5α-epoxymethano - 5α - androstane - 5' - carbonitrile.

18. 3β - (β - hydroxyethyloxy) - 17,17 - ethylenedioxy-3α,5α - epoxymethano - 5α - androstane - 5' - carbonitrile.

19. 3β - (β - hydroxyethyloxy) - 3α,5α - epoxymethano-5α - cholestane - 5' - carbonitrile.

20. 3β - methoxy - 3α,5α - epoxymethano - 5α - cholestane - 5' - carbonitrile.

21. 3β - (β - hydroxyethyloxy) - 20,20 - ethylenedioxy-3α,5α - epoxymethano - 5α - pregnane - 5' - methylamine.

22. 3β - (β - hydroxyethyloxy) - 17β - hydroxy - 3α,5α-epoxymethano - 5α - estrane - 5' - methylamine.

23. 3β - (β - hydroxyethyloxy) - 17β - hydroxy - 3α,5α-epoxy - methano - 5α - androstane - 5' - methylamine.

24. 3β - (β - hdroxyethyloxy) - 17,17 - ethylenedioxy-3α,5α - epoxymethano - 5α - androstane - 5' - methylamine.

25. 3β - (β - hydroxyethyloxy) - 3α,5α - epoxymethano-5α - cholestane - 5' - methylamine.

26. 3β - methoxy - 3α,5α - epoxymethano - 5α - cholestane - 5' - methylamine.

27. 3β - (β - hydroxyethyloxy) - 5' - methyl - 3α,5α-epoxymethano - 5α - 9(11) - pregnen - 20 - one.

28. 3β - (β - hydroxyethyloxy) - 5' - methyl - 3α,5α-epoxymethano - 5α - 9(11) - estren - 17β - ol.

29. 3β - (β - hydroxyethyloxy) - 5' - methyl - 3α,5α-epoxymethano - 5α - 9(11) - androsten - 7β - ol.

30. 3β - (β - hydroxyethyloxy) - 5' - methyl - 3α,5α-epoxymethano - 5α - 9(11) - androsten - 17 - one.

31. 3β - (β - hydroxyethyloxy) - 5' - methyl - 3α,5α-epoxymethano - 5α - 9(11) - cholestene.

32. 3β - methoxy - 5' - methyl - 3α,5α - epoxymethano-5α - 9(11) - cholestene.

33. A compound of the formula:

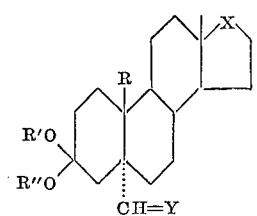

wherein R is a member selected from the group consisting of H and methyl, X is a member selected from the group consisting of:

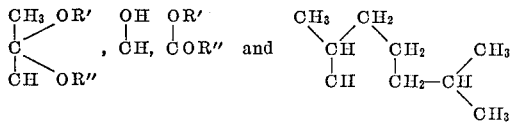

Y is a member selected from the group consisting of NH and O, and R' and R" each is lower alkyl.

34. A compound of the formula:

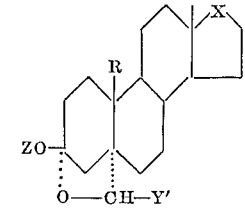

wherein R is a member selected from the group consisting of H and methyl, X is a member selected from the group consisting of:

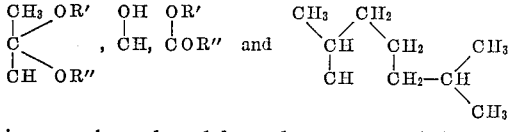

Y' is a member selected from the group consisting of CN and —CH₂NH₂, Z is a member selected from the group consisting of lower alkyl and ω-hydroxy(lower)alkyl, and R' and R" each is lower alkyl and, when linked together, are lower alkylene.

35. A compound of the formula:

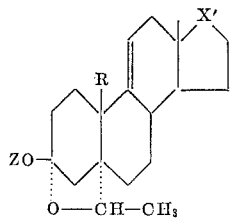

wherein R is a member selected from the group consisting of H and methyl, X' is a member selected from the group consisting of:

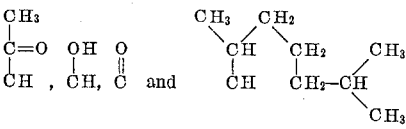

and Z is a member selected from the group consisting of lower alkyl and ω-hydroxy(lower)alkyl.

References Cited by the Examiner

Nagata: "Tetrahedron" (1961), vol. 13, pages 287 to 297.

Takeda et al.: "Steroids" (1964), vol. 4, No. 3, pages 310–311.

ELBERT L. ROBERTS, *Primary Examiner.*